United States Patent
Sankaran et al.

(10) Patent No.: US 8,006,282 B2
(45) Date of Patent: Aug. 23, 2011

(54) METHOD AND SYSTEM FOR TRACKING A USER IN A NETWORK

(75) Inventors: Ganesh Chennimalai Sankaran, Kanchipuram (IN); Venkataganesh Swaminathan, Chennai (IN); Nilesh Simaria, Chennai (IN); Karthikeyan Veerapandian, Madurai (IN)

(73) Assignee: Cisco Technology, Inc., San Jose, CA (US)

( * ) Notice: Subject to any disclaimer, the term of this patent is extended or adjusted under 35 U.S.C. 154(b) by 896 days.

(21) Appl. No.: 11/511,964

(22) Filed: Aug. 29, 2006

(65) Prior Publication Data

US 2008/0072285 A1    Mar. 20, 2008

(51) Int. Cl.
*G06F 7/04* (2006.01)
(52) U.S. Cl. ............... 726/2; 709/201; 709/220
(58) Field of Classification Search .................. 726/2–7, 726/14; 709/201, 220; 713/151–152
See application file for complete search history.

(56) References Cited

U.S. PATENT DOCUMENTS

| | | | |
|---|---|---|---|
| 6,609,152 B1 * | 8/2003 | Ono | 709/222 |
| 2003/0046329 A1 * | 3/2003 | Sasabe et al. | 709/201 |
| 2005/0188222 A1 * | 8/2005 | Motsinger et al. | 713/201 |
| 2008/0072285 A1 * | 3/2008 | Sankaran et al. | 726/2 |

OTHER PUBLICATIONS

Fred Leeflang; Functional Documentation "User Tracking"; May 19, 2004; 10 pages; http://usertracking.surfnet.nl/Functional.pdf#search=%22FRED%20LEEFLANG%3B%20Functional%20Documentation%20%22User%20Tracking%22%22.

* cited by examiner

*Primary Examiner* — David J Pearson
*Assistant Examiner* — Angela Holmes
(74) *Attorney, Agent, or Firm* — Fish & Richardson P.C.

(57) ABSTRACT

A method and a system are provided for tracking a user in a network. The method and system includes a Network Management System (NMS) to receive notifications from one or more network devices in the network. The notifications are generated by push-based mechanisms. Thereafter, the NMS combines the information received from the notifications in a database. Subsequently, a correlating engine correlates the combined information to track the user.

21 Claims, 6 Drawing Sheets

METHOD AND SYSTEM FOR TRACKING A USER IN A NETWORK

BACKGROUND OF THE INVENTION

1. Field of Invention

Embodiments of the invention relate, in general, to networking. More specifically, embodiments of the invention relate to a method and a system for tracking a user in a network.

2. Description of the Background Art

In a typical network, there are several network devices such as servers, computers, routers, switches, and so forth. Examples of a network include Local Area Networks (LANs), Wide Area Networks (WANs), and Metropolitan Area Networks (MANs), among others. The network devices in the network may be coupled to other devices in the network by one or more transmission cables or by wireless means. The various network devices communicate with each other based on certain rules which are termed as protocols. A typical network device in the network communicates with the other network devices based on the 802 group of protocols. The 802 group of protocols are Institute of Electrical and Electronics Engineers (IEEE) standards for port-based authentication of network devices. Ports are access points through which network devices are connected to the network. These 802 standards are used to authenticate the network devices attached to various ports of the network before allowing them access to the network. In case the authentication fails, the network device/s are denied access to the network.

The process of authenticating a network device before granting it access to the network gives network administrators some control over the network as well as the user. Network administrators may track users that access the network through the network devices, to trace malfunctions or security violations back to the user. For such tracking of users, certain information about the user and their associated network device has to be collected. This information needs to be collected continuously so that real-time information is available to the network administrators. The real-time information provides the latest information about the user, which is relevant for tracking the users.

Network devices based on 802 standards can connect to any switch port in the network. Therefore, tracking of 802 based network devices is performed using a 'user-tracking discovery'. 'User-tracking discovery' is a periodically executed pull-based mechanism that retrieves information about the user and their associated network device. Under the 802 standards, an Authentication, Authorization, and Accounting (AAA) server receives the user information provided by the network device through a switch port using a Remote Authentication Dial-in-User Service (RADIUS) protocol. The retrieved user information is stored as a database record that relates the user to a network device and, subsequently, the network device to a switch port. The user information record is used by network administrators, as and when required, to track users in the network.

However, since 802 based network devices can connect to more than one switch port in the network over a period of time, the pull-based mechanism has to be executed at regular intervals to ensure that the information in the database is current. The continuous execution of the pull-based mechanism generates a lot of traffic in the network, unnecessarily consumes network bandwidth and consequently slows down the network.

Moreover, the need for continuous execution of the pull-based mechanism inherently leads to a time-gap between the real-time information of the user and the available information.

Another existing method for tracking users on the switches by using Dynamic Host Configuration Protocol (DHCP) snooping at the switch port to detect the IP address of the network device. DHCP is a communications protocol that automates the assignment of Internet Protocol (IP) addresses in an organization's network. In this method, the required information of the network device is collected from each switch in the network. The collected information includes multiple data items such as the Media Access Control (MAC) address of the network device, the Internet Protocol (IP) address of the network device, the switch IP address, 802.1x Switch port address, among others. Subsequently, the collected information is correlated to a single user by binding multiple data items, such as the MAC address of the network device, the IP address of the network device, IP address of the switch, etc. The correlated information is stored in a database and used by network administrators, as and when required, to track users in the network.

The MAC address of a network device is generally unique for each network device. Hence, it is used as a primary key for storing data in the database. However, there is a possibility that more than one network device can share a MAC address. The method described above resolves the problem of duplicate MAC addresses by using a composite key of MAC address of the network device, IP address of the network device and IP address of the switch. The composite key is used to correlate information associated with the network device to a unique user.

DHCP snooping is a security feature that enables a switch port to differentiate between unknown interfaces connected to the user and known interfaces connected to the DHCP server or another switch port. DHCP is a communications protocol that allows network administrators to manage and automate the assigning of IP addresses in a network. DHCP allows network devices to connect to a network and automatically assigns the network devices an IP address. An unknown interface is an interface that is configured to receive messages from outside the network. A known interface is an interface that is configured to receive messages only from within the network. An AAA server includes software that handles user requests for accessing the network. A RADIUS server is a server that uses a multi-user client-server security protocol such as an AAA (authentication, authorization and accounting) protocol to provide several kinds of authentication schemes for authenticating users on wired or wireless network device/s. The DHCP snooping described above is a pull-based mechanism since it periodically retrieves user information from the network devices.

However, the use of pull-based mechanisms, as explained earlier, to collect information about the user and the associated network device leads to lower performance levels in the network. The method also correlates information about the user on the basis of multiple data items. Such a correlation increases the complexity of the database structure and the processes involved in updating the database. Moreover, the method does not provide a mechanism for tracking a user that is connected to the network through wireless network devices.

DETAILED DESCRIPTION OF EMBODIMENTS OF THE INVENTION

Embodiments of the invention provide a method and a system for tracking a user in a network that has a number of network devices. In the description herein for embodiments of the present invention, numerous specific details are provided such as examples of components and/or methods that provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or so forth. In other instances, well-known structures, materials, or operations are not specifically shown or described in detail to avoid obscuring aspects of embodiments of the present invention.

In accordance with an embodiment of the invention, notifications from several sources, such as servers, computer systems, switches, routers, and so forth, are received at a Network Management System (NMS). The notifications include information about the users and the associated network devices. The notifications are generated through push-based mechanisms, which are asynchronous in nature. The push-based mechanisms are mechanisms that automatically generate notifications, based on certain triggers. Some examples of push-based mechanisms are Cisco products such as CISCO-MAC-NOTIFICATION-MIB, CiscoSecure ACS, and UTLite. However, other push-based mechanisms may be used or new push-based mechanisms may be developed to retrieve information about the user and the associated network device. Triggers can be user events that initiate the generation of notifications by the asynchronous push-based mechanisms. An example of a user event acting as a trigger is login or logout of a user on network device/s. Thereafter, pull-based mechanisms are used to retrieve information from the network devices, if additional information is required to track the user. The information received through the notifications is combined and correlated to a single user. Correlating information involves relating the information received from various network devices to a single user. The correlated information for each such user is stored in a database as a user information record. The database can use Media Access Control (MAC) address of a network device as a primary key for storing the user information record in the database. Usually, the Media Access Control (MAC) address is a unique identifier of a network device. However, more than one network device can have a duplicate MAC address. In accordance with an embodiment of the invention, the duplicate MAC addresses are resolved during correlation to remove any ambiguity regarding information about the user. Thereafter, the information stored in the database is used by network administrators to track the user in the network.

Figure 1:
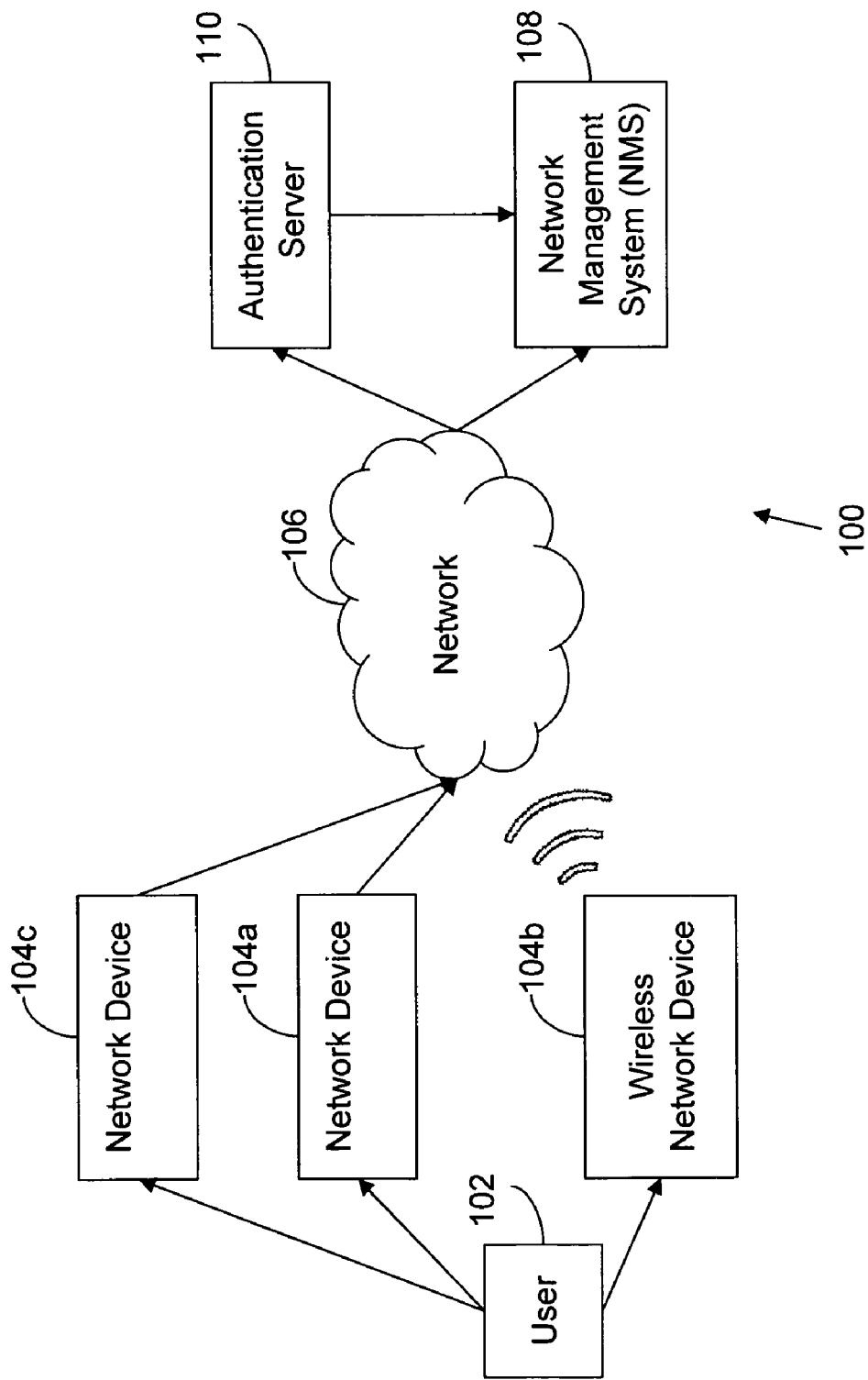
FIG. 1 illustrates an environment of the invention in accordance with embodiments of the invention.

Referring now to the drawings, more particularly by their reference numbers, FIG. 1 illustrates an environment 100. Environment 100 includes a user 102, wired network devices 104a and 104c, wireless network device 104b, network 106, Network Management System (NMS) 108, and an authentication server 110. One skilled in the art will appreciate that FIG. 1 is merely a representation of a simplified network for the purpose of illustrating the present embodiment and the present invention is not to be limited by the number of illustrated network devices. Examples of network 106 include Local Area Networks (LANs), Wide Area Networks (WANs), and Metropolitan Area Networks (MANs), etc.

As illustrated in FIG. 1, a plurality of network devices 104 is connected to network 106. User 102 can access network 106 through any of the network devices 104. Network devices 104 may be wired network devices 104a and 104c or wireless network device 104b. Examples of network devices 104 include, but are not limited to, servers, personal computers, routers and switches.

Network devices 104 communicate with each other, based on the IEEE 802 group of protocols. The 802 protocols are Institute of Electrical and Electronics Engineers (IEEE) standards for port-based authentication of network devices. Ports are access points through which network devices 104 are connected to network 106.

Authentication server 110 verifies the identity of user 102 and the associated network device before granting them access to network 106. In an embodiment of the invention, authentication server 110 is a Remote authentication dial-in user service (RADIUS) server. A RADIUS server is a server that uses a multi-user client-server security protocol such as an AAA (authentication, authorization and accounting) protocol to provide various authentication schemes for authenticating users on wired or wireless network device/s 104.

Authentication server 110 communicates with network devices 104. NMS 108 receives the notifications from network devices 104 and authentication server 110, combines and correlates the information included in the notifications, and stores the correlated information in a database. NMS 108 also employs pull-based mechanism, to generate requests that retrieve information from network devices 104, if additional information is required to track the user.

Figure 2:
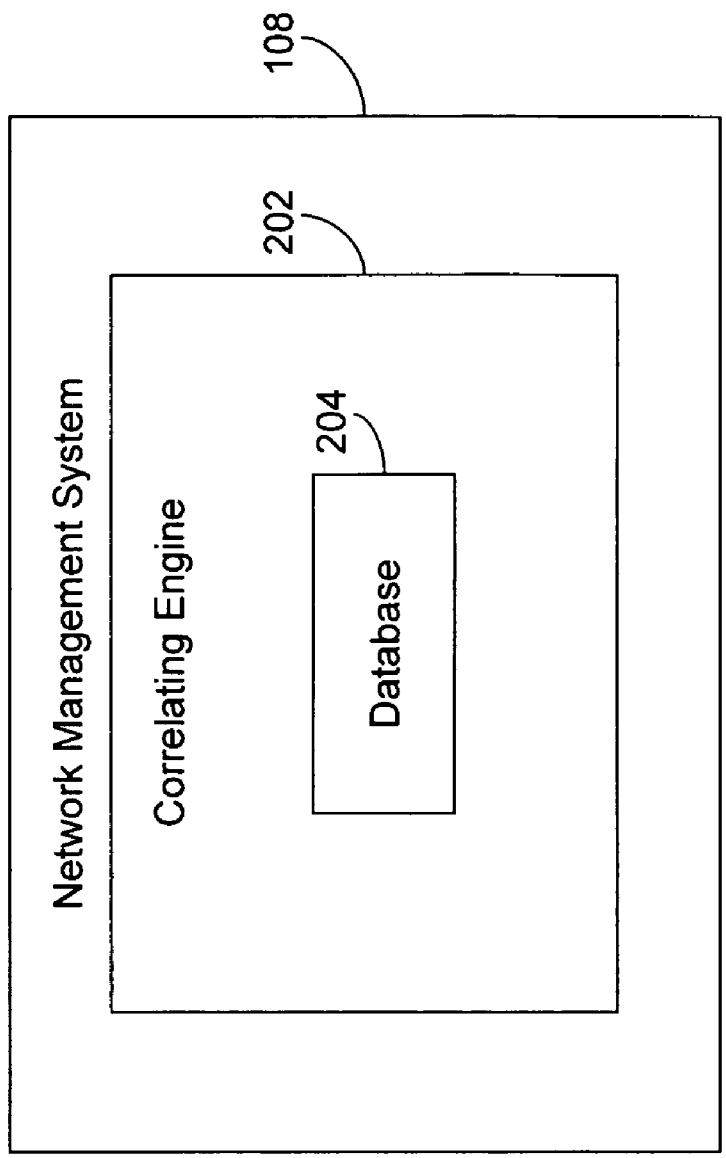
FIG. 2 is a block diagram of a network management system in accordance with an embodiment of the invention.

FIG. 2 is a block diagram of NMS 108, in accordance with an embodiment of the invention. NMS 108 includes correlating engine 202. NMS 108 receives notifications from network devices 104 and authentication server 110. Thereafter, correlating engine 202 combines the information received through the notifications. Thereafter, the combined information is correlated and stored in database 204 as a user-information record. Database 204 resides in correlating engine 202.

The user-information record contains user information such as login id, etc. and network device information such as MAC address, switch port address, and Virtual LAN (VLAN) name of network devices 104 of all users. The MAC address is a unique identifier of the network device that is used as a primary key in database 204.

Database 204 includes a user-tracking table, which stores the user information records, and a MAC address table that stores duplicate MAC addresses. Correlating engine 202 uses the data in the MAC address table to resolve duplicate MAC addresses of network devices 104. This has been explained in detail in conjunction with FIG. 4.

Moreover, correlating engine 202 includes means to wirelessly track user 102 that accesses network 106 through wireless network devices 104. For wireless network device 104b, correlating engine 202 tracks user 102 that accesses network 106 by using the information provided by a wireless engine. A wireless engine is a software program that provides information about the state of the wireless network device 104b. In an embodiment of the invention, wireless engine is used to retrieve information about the active/inactive state of wireless network device 104b. This has been explained in detail in conjunction with FIG. 5.

Figure 3A:
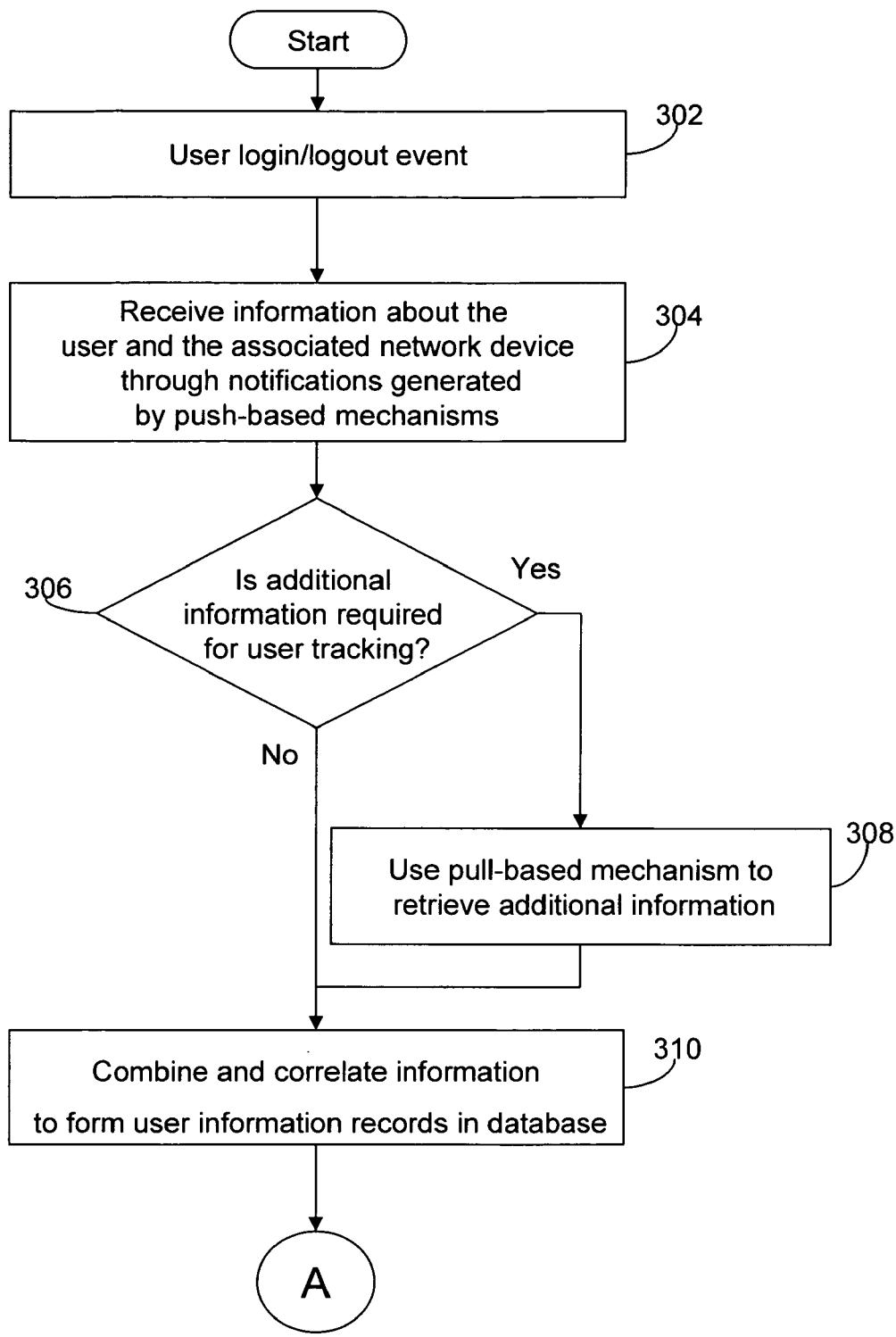
FIGS. 3a and 3b illustrate a flow diagram of a method for tracking a user in a network in accordance with an embodiment of the invention.
Figure 3B:
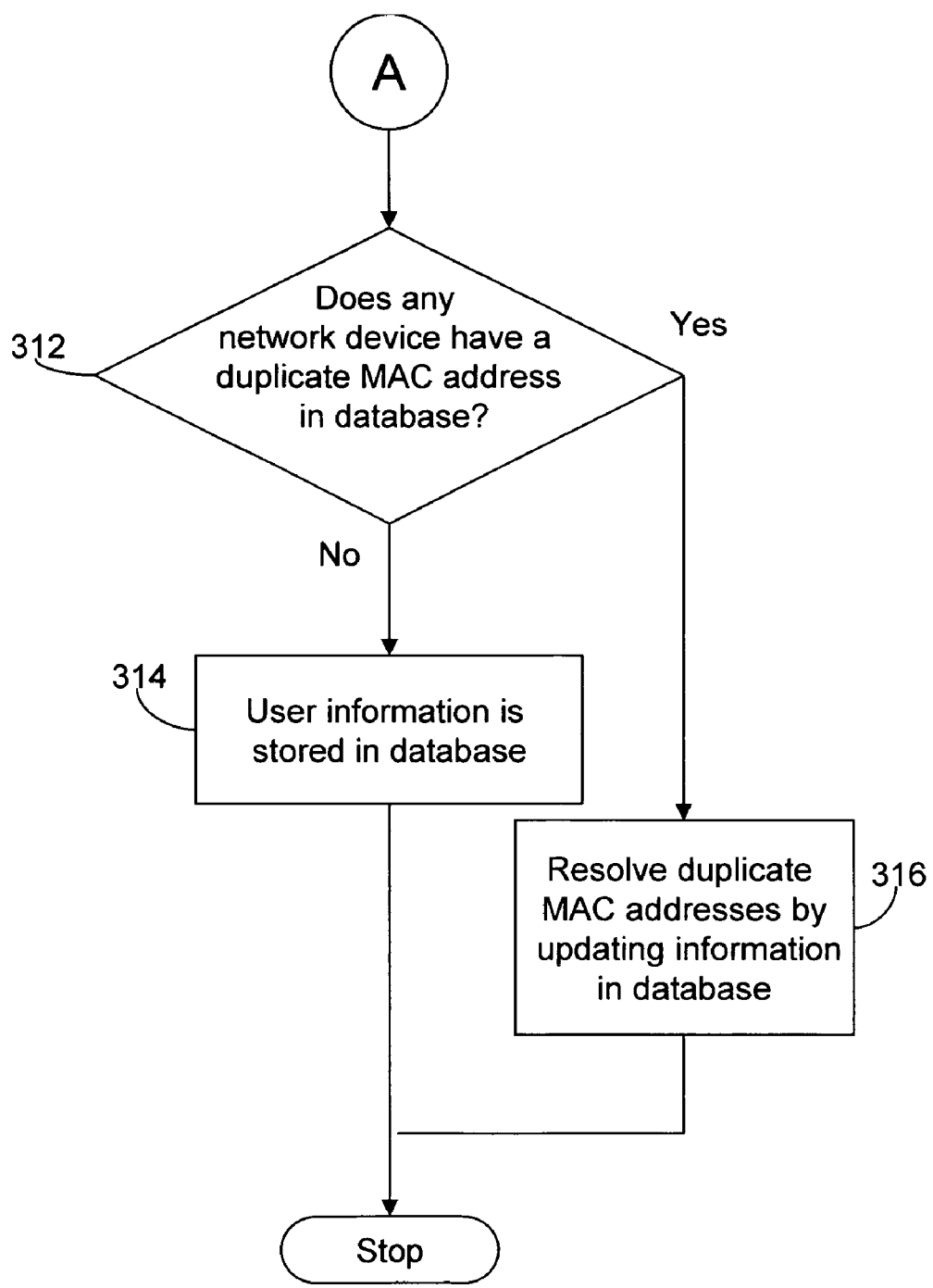

FIGS. 3a and 3b illustrate a flow diagram of a method for tracking user 102 that accesses network 106 through network devices 104, in accordance with an embodiment of the invention. At 302, user 102 logs in or logs out of network 106 through network devices 104. At 304, the login or logout event of user 102 acts as a trigger for sources, such as servers, authentication servers, computer systems, routers, and switches, to generate notifications using push-based mechanisms.

The notifications include user information such as login id, and network device information such as MAC address, IP address, Switch port address and VLAN. This information is required to track network device/s 104 and thereby, user 102.

Push-based mechanisms generate notifications that have real-time information about user 102 and the associated network device/s 104.

Triggers are user events that initiate the generation of notifications by the asynchronous push-based mechanisms. An example of a typical user event, acting as a trigger, is login or logout of user 102 on network device 104. In one embodiment, a notification MIB such as CISCO-MAC-NOTIFICATION-MIB generates a notification whenever a MAC address of a network device 104 is added or removed from the MAC address table, which is in database 204. The addition or removal of MAC address also corresponds to user login or logout event apart from the addition or removal of network devices 104.

CiscoSecure Access Control Server (ACS) generates a notification based on RADIUS authentication of network devices 104. CiscoSecure ACS extends access security by combining authentication, user and administrator access and hence, provides a comprehensive identity networking solution. Some of the features used by CiscoSecure for pushing information are Remote Agent, ODBC logging feature or syslog notifications.

UTLite generates a notification on every user login or logout. The notification includes periodic login user information from network devices 104.

To illustrate the above method with an example, let us consider three asynchronous events occurring at different time intervals. Say, at time T1, a network device 104a is plugged into network 106. Subsequently, at T1+x, where x is an interval of time, authentication is performed by authentication server 110 and access to network 106 is given. Thereafter, network devices 104 send user information to NMS 108. At this point, the MAC address of the network device is added to the MAC address table in database 204. The event of the addition of the MAC address generates a notification from CISCO-MAC-NOTIFICATION-MIB to NMS 108 that contains VLAN, MAC addresses of network devices 104, switch port address, etc.

Thereafter, at T1+y, where y is another time interval, authentication server 110, upon successful authentication, generates an Open Database Connectivity (ODBC) logging event. The ODBC logging is configured in such a way that NMS 108 receives a notification from Cisco Secure ACS. The notification includes information such as Switch IP address, NAS-IP-Address, Switch port-NAS-Port, Username, Session start/end and MAC address.

Next, at T1+z, where z is another time interval, user 102 logs in to network 106. Subsequently, UTLite generates a notification that includes user login information and sends it to NMS 108. The notification includes MAC address, IP address and name of the user logged in.

At 306, it is ascertained whether additional information such as switch port speed, VLAN name and VTP domain, is required for tracking user 102. Additional information may be required, based on the requirements of the network administrators and the specific configuration of network 106. For example, in a VLAN, the notifications generated through push-based mechanisms include information such as MAC address, switch port address, IP address, user name and switch IP address. However, a VLAN name may also be required for tracking user 102. In such a case, a pull-based mechanism is used to collect the VLAN name.

In case additional information is required, then at 308, the required information is retrieved by using a pull-based mechanism. The pull-based mechanism requests selected information from the network device 104. The pull-based mechanism is executed on network 106. However, if additional information is not required for one of the notifications generated through push-based mechanism, then at 310, the received network device information of user 102 is combined. The combined information is correlated, based on the MAC address of the network devices 104. Thereafter, the correlated information is stored in database 204 as a user information record. The user information record includes fields such as MAC address, IP Address, User name, Switch IP Address, switch port address, VLAN, Login and Logout.

At 312, it is ascertained whether duplicate MAC addresses exist in database 204. Duplicate MAC addresses are present in a network when multiple Ethernet interfaces on the same network device use a common MAC address. Duplicate MAC addresses are also present if two or more network devices have the same MAC address. Additionally, in some cases, a network device has multiple ports with the same MAC address.

In case duplicate MAC addresses are present in network 106, the MAC address cannot be treated as the primary key for the user-tracking table. A primary key is a value in a database that can be used to identify a unique row in a table. In accordance with an embodiment of the present invention, a combination of MAC address and additional identifiers is used to resolve the ambiguity arising due to duplicate MAC addresses.

Therefore, at 316, correlating engine 202 resolves duplicate MAC addresses by updating the information in database 204 in a certain manner as explained later in conjunction with FIG. 4.

However, if there are no duplicate MAC addresses in database 204, then at 314, the user information is stored in database 204. The stored user information in database 204 is used to track user 102 in network 106.

NMS 108 uses correlating engine 202 to track user 102 that is connected to network 106 through wireless network device 104b. The tracking involves use of wireless engine by correlation engine 202 to retrieve information about the active/inactive state of wireless network device 104b. Thereafter, correlation engine 202 correlates the information provided by the wireless engine using a correlation mechanism. The correlation mechanism relates the information received from wireless network device 104b to a single user. This correlation mechanism is explained later in conjunction with FIG. 5.

Additional push-based mechanisms can be used to provide login or logout information for 802.1x-based network devices 104.

Moreover, each notification communicates distinct information about 802.1x-based network devices 104 to NMS 108. In such a scenario, a network device attribute common in all notifications, such as a MAC address, is used as a primary key for correlating and storing information in database 204. In such a case, if MAC address is unique in network 106, it is taken as a primary key and the additional information is stored. However, if there are duplicate MAC addresses in network 106, a different method is followed, as is explained in conjunction with FIG. 4.

In an embodiment of the invention, pull-based mechanism is not needed if the required additional information is included in notifications obtained from push-based mechanisms. In such a case, a complete user-tracking record is created in database 204 as soon as user 102 logs in or logs out of network 106. Consequently, the push-based mechanism eliminates the need for using the time-consuming pull-based mechanism to track users. The continuous execution of the pull-based mechanisms generates a lot of traffic in the network, which consumes network bandwidth. As a consequence, pull-based mechanism consumes a lot of time.

Figure 4:
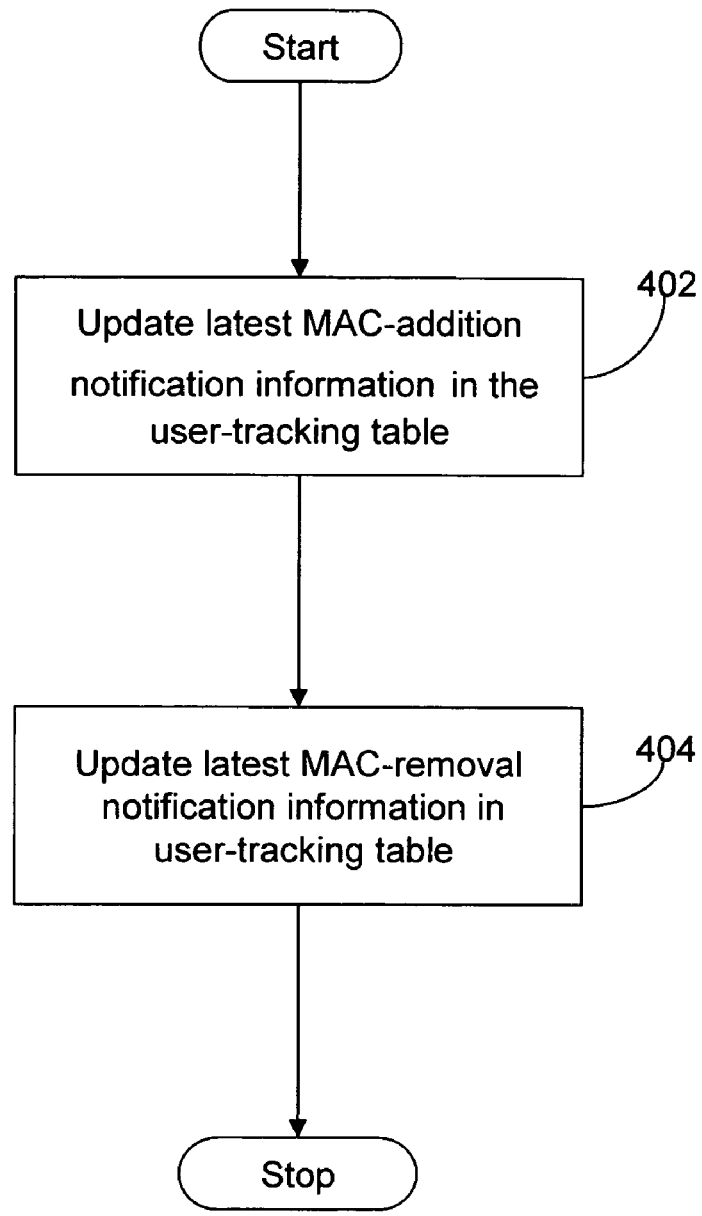
FIG. 4 is a flow diagram of a method for resolving duplicate MAC addresses in accordance with an embodiment of the invention.

FIG. 4 is a flow diagram of a method for resolving duplicate MAC addresses of network devices 104. As mentioned earlier, the MAC addresses are used as primary keys for storing user information in database 204. However, user 102 cannot be tracked if duplicate information related to user 102 exists in database 204. The duplicate MAC address-based network devices are detected using a user-tracking mechanism by correlating engine 202. The user-tracking mechanism involves updating the information in the MAC address table in such a manner that any ambiguity regarding duplicate MAC addresses of network devices 104 is removed.

At 402, the user-tracking table is updated with the latest MAC-addition notification information. For example, consider that two notifications are received for adding the same MAC address to database 204. Thereafter, the duplicate MAC address is stored in a MAC address table in database 204.

An exemplary record of the MAC address table is as follows:

| MAC-address | Count |
| --- | --- |
| 00-02-01-04-05-06 | 3 |
| 00-08-02-98-30-40 | 2 |

The count field in the above sample table indicates the number of duplicate MAC addresses present in the MAC address table.

For example, there are three duplicate entries corresponding to MAC address 00-02-01-04-05-06 in the table given below. An exemplary record of user tracking information, is as follows:

TABLE 1

| MAC-address | Address | Switch Port | Status |
| --- | --- | --- | --- |
| 00-02-01-04-05-06 | 10.1.1.1 | 1/1 | active |
| 00-02-01-04-05-06 | 10.1.1.2 | 1/2 | active |
| 00-02-01-04-05-06 | 10.1.1.3 | 1/3 | active |
| 00-08-02-98-30-40 | 10.1.1.4 | 1/4 | active |
| 00-08-02-98-30-40 | 10.1.1.5 | 1/5 | active |
| 00-08-02-98-30-42 | 10.2.2.1 | 3/2 | active |

The address field in the above table indicates IP address of network devices 104. Switch port field indicates the switch port address of network devices 104. The status field indicates information about the present state of network devices 104. Inactive status means that the network device corresponding to the user information record is not connected to the network.

Now consider, for example, that the notifications are received from switch port 1 of network device 104a and switch port 2 of network device 104c with the same MAC address: 00-02-01-04-05-06. Thereafter, it is ascertained whether MAC address 00-02-01-04-05-06 exists in the MAC address table. In case the MAC address (00-08-02-98-30-42) is unique, (there is no record of the MAC address in the MAC address table) then it is assumed that the network device moved from network device 104a, switch port 1 to network device 104c, switch port 2 and the notification to remove MAC address from device A was lost due to some reason. Thereafter, the user-tracking table is updated with the latest MAC-addition notification information irrespective of whether the current user information record is marked as 'active' or 'inactive'. However, if the MAC address is found in the MAC address table (00-02-01-04-05-06), a further comparison is carried out. The user information record that is marked as 'inactive' is selected and the MAC-addition notification information is updated.

An exemplary record of user tracking, before updating, is as follows:

TABLE 2

| MAC-address | Address | Switch port | Status | |
| --- | --- | --- | --- | --- |
| 00-02-01-04-05-06 | 10.1.1.1 | 1/1 | active | |
| 00-02-01-04-05-06 | 10.1.1.2 | 1/2 | inactive | <---------- inactive record |
| 00-02-01-04-05-06 | 10.1.1.3 | 1/3 | active | |

The status field in the above sample table indicates the present state of network devices 104.

An exemplary record of user tracking, after updating, is as follows:

TABLE 3

| Network Device 104a, switch port 1, | | | | |
|---|---|---|---|---|
| MAC-address | Address | Switch port | Status | |
| 00-02-01-04-05-06 | 10.1.1.1 | 1/1 | active | |
| 00-02-01-04-05-06 | 104a | 1 | active | <----------- updated record |
| 00-02-01-04-05-06 | 10.1.1.3 | 1/3 | active | |

If all the entries are active, then at least one MAC-remove notification is lost. In such a case, an arbitrary updating follows and any one of the entries (usually the first record is selected) is modified to reflect the information from the new MAC-addition notification.

An exemplary record of user tracking, after updating, is as follows:

TABLE 4

| updating Table 3 Network Device 104c, switch port 2, | | | | |
|---|---|---|---|---|
| MAC-address | Address | Switch port | Status | |
| 00-02-01-04-05-06 | 104b | 2 | active | <----------- updated record |
| 00-02-01-04-05-06 | 104a | 1 | active | |
| 00-02-01-04-05-06 | 10.1.1.3 | 1/3 | active | |

At 404, a couple of notifications are received for removing the same MAC address. This MAC address is stored in database 204 in a MAC address table.

For example, consider that the notifications are received from switch port 1 of network device 104a and switch port 2 of network device 104c with the same MAC address: 00-02-01-04-05-06. Thereafter, it is ascertained whether MAC address 00-02-01-04-05-06 exists in the MAC address table. In case MAC address 00-02-01-04-05-06 is unique; the wireless association entry is marked as inactive, based on the latest MAC-remove notification, assuming that the MAC-addition notification was lost due to some reason. However, if the MAC address is found in MAC address table, then a further comparison is carried out. The record with the same network device information is chosen and updated.

An exemplary record of user tracking, before updating, is as follows:

TABLE 5

| MAC-address | Address | Switch port | Status |
|---|---|---|---|
| 00-02-01-04-05-06 | 104b | 2 | active |
| 00-02-01-04-05-06 | 104a | 1 | active |
| 00-02-01-04-05-06 | 10.1.1.3 | 1/3 | active |

Address field in the above sample table indicates IP address of network devices 104. Switch port field indicates the port address of network devices 104. Status field indicates the present working status of network devices 104. Inactive status means that the network device corresponding to the user information record is not connected to the network.

An exemplary record of user tracking, after updating, is as follows:

TABLE 6

| Network Device 104a, Switch port 1, | | | | |
|---|---|---|---|---|
| MAC-address | Address | Switch port | Status | |
| 00-02-01-04-05-06 | 104b | 2 | active | |
| 00-02-01-04-05-06 | 104a | 1 | inactive | <----------- updated record |
| 00-02-01-04-05-06 | 10.1.1.3 | 1/3 | active | |

Henceforth, if there are no entries related to network device (for example network device 104c, Switch port 3) information, then user tracking could be out-of-sync with network 106 and one of the records (usually the first record is selected) would be chosen and updated.

An exemplary record of user tracking, after updating, is as follows:

TABLE 7 updating Table 6 Network device 104c, Switch port 3,

| MAC-address | Address | Switch port | Status | |
|---|---|---|---|---|
| 00-02-01-04-05-06 | 104c | 3 | inactive | <----------- updated record |
| 00-02-01-04-05-06 | 104a | 1 | inactive | |
| 00-02-01-04-05-06 | 10.1.1.3 | 1/3 | active | |

Consequently, the duplicate MAC addresses are resolved, as explained above, and this ensures that only a unique user information record is present in database 204 for each user 102.

Figure 5:
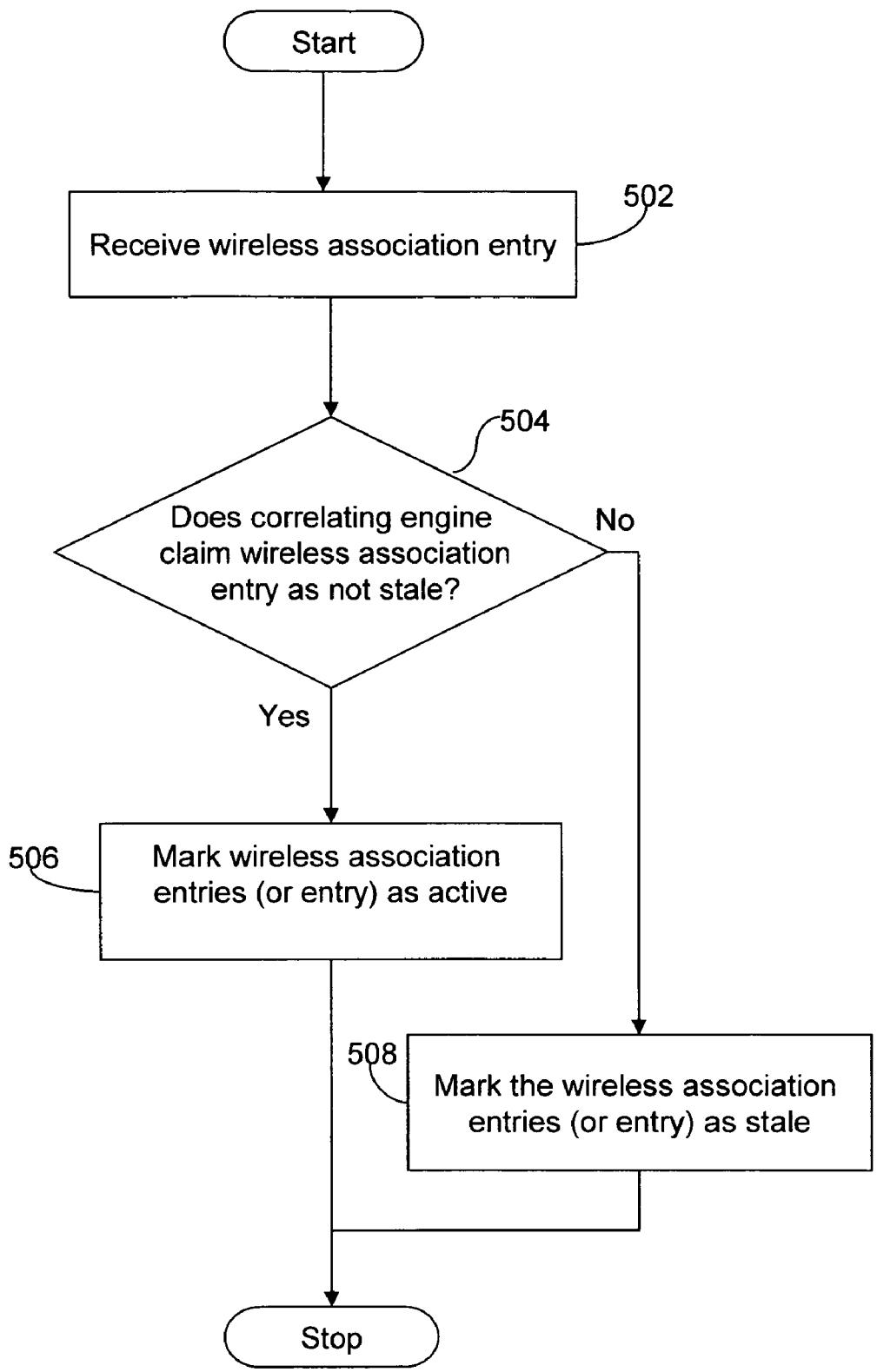
FIG. 5 is a flow diagram of a method for tracking a user that accesses a network through wireless network devices in accordance with an embodiment of the invention.

FIG. 5 is a flow diagram of a method for tracking user 102 that accesses network 106 through wireless network device 104b. Tracking wireless network device/s 104b, by considering the point of connection with network 106, will result in tracking the network devices rather than tracking user 102. Consequently, a different approach is used for tracking user 102 in network 106 with wireless network device 104b.

At 502, user information from wireless network device 104b is received through notifications at NMS 108. User information is filtered to understand network inactivity of wireless network device 104b. Only the first network activity and the last network inactivity information are considered for user tracking. The tracking is performed by correlating engine 202.

Correlating engine 202 uses a wireless engine to retrieve the latest wireless association entry of wireless network device 104b from the switch ports. The wireless association entry includes association and disassociation information of a wireless network device. Therefore, the wireless association entry indicates the state of the wireless network device.

Thereafter, at 504, it is ascertained whether the wireless association entry is stale or active. An active status means that the wireless network device is currently plugged into the network and the wireless network device information is the latest one. A wireless network device that is marked as 'stale' is not currently plugged into network 106.

At 506, the wireless association entry is marked as active and the 'active' information is accepted if at least one wireless engine claims that the wireless association entry is not 'stale'. At 508, the wireless association entry is marked as stale if all wireless engines mention the wireless association entries (or entry) as 'stale' and the wireless network device 104b is marked as 'not currently plugged into the network'.

Moreover, in an implicitly stale condition, one or more wireless engines mention that the wireless network device information is 'stale' and other wireless engines do not have any association or disassociation information about the wireless network device from other network elements. In such a scenario, it is assumed that wireless network device 104b is not currently plugged into network 106.

Moreover, in an explicitly stale condition, all wireless engines mention that the wireless network device information is 'stale'.

Embodiments of the invention provide a method and system for tracking 802.1x based network devices based on real time information. The method that takes less time, to receive information about the user and the associated network device, than the time taken in conventional pull-based mechanisms.

Embodiments of the present invention provide a method for tracking wired and wireless network devices. The tracking is performed using information about the mobility history of the wireless network devices. Mobility history information includes information logs on the mobility of users across the network.

Embodiments of the present invention provide a method for resolving duplicate MAC addresses by considering trigger-related information and the time of the trigger.

In one embodiment of the invention, the amount of notifications generated is directly proportional to the number of changes in the network. Consequently, no network traffic is generated when there are no changes.

In another embodiment of the invention, network traffic is reduced since only one (notification) packet contributes to the network traffic as against the two request/response (notification) packets in pull-based mechanisms.

In yet another embodiment of the invention, network bandwidth is conserved and there is an increase in the efficiency of the network. This is achieved by receiving and correlating information in the network at different times.

According to embodiments of the invention, a method for tracking a user in a network is provided. The method comprises receiving notifications from network devices in the network by one or more push-based mechanisms; combining the information received from the notifications in a database, and then, correlating the combined information to track the user.

According to embodiments of the invention, a network management system is provided for tracking a user in a network. The network management system comprises means for receiving notifications from one or more network devices in the network; and a correlating engine for correlating the received notifications to track the user.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Moreover, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Moreover, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
   receiving, at a network management system (NMS) and from a network device, a notification generated using the network device, the notification being triggered by a user event and including information that associates a user with the user event and the network device;
   determining, using the NMS and based on the received notification, whether additional information is required from the network device for associating the user with the event and the network device;
   based on a determination that the additional information is required from the network device:
      retrieving the additional information from the network device;
      combining the information included in the received notification with the additional information; and
      associating the combined information with the user to form a user information record related to the user, the association being based on an address of the network device and an address of one or more other network devices;
   based on a determination that the additional information is not required from the network device, associating the information included in the received notification with the user to form a user information record related to the user, the association being based on an address of the network device and an address of one or more other network devices;
   determining, using the NMS, whether duplicate addresses exist in a database for the network device and the one or more other network devices;
   based on a determination that the duplicate addresses exist in the database:
      resolving the duplicate addresses in the database; and
      storing the user information record in the database; and
   based on a determination that the duplicate addresses do not exist in the database, storing the user information record in the database.

2. The method of claim 1, wherein the user event is associated with a user action performed using the network device.

3. The method of claim 1, wherein the notification is generated by a push-based mechanism, wherein the push-based mechanism is an asynchronous push-based mechanism associated with the network device.

4. The method of claim 1, wherein notifications are received from the network device and an authentication server; and wherein the NMS combines and correlates different network device information included in the notifications and stores the correlated information in a database.

5. The method of claim 4, wherein the different network device information comprises different attribute information from a same network device or different attribute information for different network devices.

6. The method of claim 1, wherein the NMS requests the additional information from the network device using a pull-based mechanism.

7. The method of claim 1, wherein resolving the duplicate addresses comprises resolving duplicate media access control (MAC) addresses by combining a MAC address with user identifiers and using the information for the combined MAC address and user identifiers as a primary key for storing information about the user in a database.

8. The method of claim 7, wherein resolving the duplicate addresses further comprises relating stored information to the user.

9. The method of claim 7, wherein resolving duplicate MAC addresses comprises:
   updating a most recent MAC addition notification information in the database when MAC addition notifications are received for same MAC address from different switch ports; and
   updating the most recent MAC removal notification information in a user tracking table in the database when MAC removal notifications are received for the MAC address from the different switch ports.

10. The method of claim 1, wherein the network device is a wireless network device.

11. The method of claim 10, further comprising:
   receiving wireless network device information from the wireless network device; and
   updating wireless association entries in a database.

12. The method of claim 11, wherein the wireless network device information comprises at least one selected from a group including MAC address, IP address, and switch port address.

13. The method of claim 11, wherein the wireless association entries comprise information indicating a state of wireless network devices.

14. The method of claim 11, wherein updating the wireless association entries comprises marking the wireless association entries as active provided the wireless network device information is not stale.

15. The method of claim 11, wherein updating the wireless association entries comprises marking the wireless association entries as stale provided there is no information about the wireless network device.

16. A network management system comprising:
a database for storing information associated with a notification received from a network device, wherein the notification is generated based on a user event using the network device, the notification including user information and different network device information, wherein the user information comprises user identification;
a mechanism for determining, based on the received notification, whether additional information is required from the network device for associating the user with the user event and the network device;
a pull-based mechanism for requesting and receiving additional information from the network device based on a determination that additional information is required from the network device for associating the user with the user event and the network device; and
a correlating engine for correlating the different network device information in the notification received from the network device and the additional information to create a user information record associated with the user, wherein the correlating engine is further configured to:
determine whether duplicate addresses exist in the database for the network device and one or more other network devices; and
resolve the duplicate addresses in the database based on a determination that duplicate addresses exist in the database.

17. The system of claim 16, wherein the correlating engine comprises means for updating wireless association entries in a database.

18. The system of claim 16, wherein the correlating engine further comprises means for correlating the information in the notification received from the network device and the additional information to a single user and storing the correlated information in the database.

19. An apparatus comprising:
means for receiving, at a network management system (NMS), notifications from at least one network device in a network, wherein the notifications are generated based on a user event associated with the at least one network device, the notifications including user information and different network device information, wherein the user event that triggers the generation of notifications is associated with a login activity, wherein user information comprises a user identification;
one or more processors configured to perform operations comprising:
determining, based on the received notification, whether additional information is required from the at least one network device for associating the user with the user event and the network device;
requesting and processing additional information from the at least one network device based on a determination that additional information is required from the at least one network device for associating the user with the user event and the at least one network device; and
a correlation engine configured to correlate the different network device information in the notifications received from the at least one network device and the additional information to create a user information record associated with the user to track the user in the network.

20. The apparatus of claim 19, wherein the correlating engine is further configured to resolve duplicate MAC addresses in a MAC address table.

21. The apparatus of claim 19, wherein the correlating engine comprises a database.

* * * * *